US009742807B2

(12) United States Patent
de los Reyes et al.

(10) Patent No.: US 9,742,807 B2
(45) Date of Patent: Aug. 22, 2017

(54) SECURITY ENHANCEMENTS FOR A SOFTWARE-DEFINED NETWORK WITH NETWORK FUNCTIONS VIRTUALIZATION

(71) Applicant: AT&T Intellectual Property I, L.P., Atlanta, GA (US)

(72) Inventors: Gustavo de los Reyes, Fair Haven, NJ (US); Roger Piqueras Jover, New York, NY (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 134 days.

(21) Appl. No.: 14/547,942

(22) Filed: Nov. 19, 2014

(65) Prior Publication Data

US 2016/0142427 A1 May 19, 2016

(51) Int. Cl.
*H04L 29/06* (2006.01)

(52) U.S. Cl.
CPC .......... *H04L 63/20* (2013.01); *H04L 63/1441* (2013.01)

(58) Field of Classification Search
CPC . H04L 63/1416; H04L 63/1458; H04L 63/20; H04L 63/1441
See application file for complete search history.

(56) References Cited

U.S. PATENT DOCUMENTS

| 8,448,238 | B1 * | 5/2013 | Gupta | H04L 67/327 726/15 |
| 8,769,102 | B1 * | 7/2014 | Zhou | G06F 11/3696 709/223 |
| 8,792,941 | B2 | 7/2014 | Panchal | |
| 2011/0078797 | A1 * | 3/2011 | Beachem | G06F 21/53 726/25 |
| 2013/0138814 | A1 | 5/2013 | Kotecha | |
| 2013/0263209 | A1 | 10/2013 | Panuganty | |
| 2013/0322237 | A1 | 12/2013 | Decusatis et al. | |
| 2014/0050223 | A1 | 2/2014 | Foo et al. | |
| 2014/0133456 | A1 | 5/2014 | Donepudi et al. | |
| 2014/0153572 | A1 | 6/2014 | Hampel et al. | |
| 2014/0229945 | A1 | 8/2014 | Barkai et al. | |
| 2014/0259012 | A1 | 9/2014 | Nandlall et al. | |
| 2014/0280488 | A1 | 9/2014 | Voit et al. | |
| 2014/0281021 | A1 | 9/2014 | Chrysos et al. | |
| 2014/0282529 | A1 | 9/2014 | Bugenhagen | |
| 2014/0282944 | A1 | 9/2014 | Li | |

(Continued)

OTHER PUBLICATIONS

Derakhshan, et al., "Enabling Cloud Connectivity Using SDN and NFV Technologies," Networks and Management, 2013, pp. 245-258, Springer International Publishing, Germany, Retrieved on Sep. 29, 2014.

(Continued)

*Primary Examiner* — Mahfuzur Rahman
*Assistant Examiner* — Narciso Victoria
(74) *Attorney, Agent, or Firm* — Amin, Turocy & Watson, LLP

(57) ABSTRACT

A communication network can be constructed to support software-defined networking (SDN) protocols and network functions virtualization (NFV) protocols. Such a communication network can advantageously be operated at lower costs, increased flexibility and control, and with simplified management to name but a few. In addition to these advantages, various networking security aspects can be enhanced by leveraging the SDN/NFV architecture.

20 Claims, 11 Drawing Sheets

(56) References Cited

U.S. PATENT DOCUMENTS

| | | | | |
|---|---|---|---|---|
| 2014/0310707 | A1* | 10/2014 | Rajan | G06F 9/45533 718/1 |
| 2015/0089331 | A1* | 3/2015 | Skerry | H04L 43/0823 714/799 |
| 2016/0043944 | A1* | 2/2016 | Felstaine | H04L 43/12 370/389 |

OTHER PUBLICATIONS

Chen, et al., "Collaborative Network Security in Multi-Tenant Data Center for Cloud Computing," Tsinghua Science and Technology 1, 2014, 25 Pages, Beijing, China, Retrieved on Sep. 29, 2014.
Khan, "Virtualized EPC: Unleashing the Potential of NFV and SDN," 25th European Regional Conference of the International Telecommunications Society (ITS), Jun. 2014, 11 Pages, Brussels, Belgium, Retrieved on Sep. 29, 2014.
Jammal, et al., "Software-Defined Networking: State of the Art and Research Challenges," 2014, 24 Pages, Retrieved on Sep. 29, 2014.

\* cited by examiner

SECURITY ENHANCEMENTS FOR A SOFTWARE-DEFINED NETWORK WITH NETWORK FUNCTIONS VIRTUALIZATION

TECHNICAL FIELD

The present application relates generally to providing security elements or enhancements for a communication network configured according to software-defined networking (SDN) architecture with network functions virtualization (NFV) elements that operate in a virtual environment or cloud.

BACKGROUND

Traditional network architectures are ill-suited to meet the requirements of today's enterprises, carriers, and end users. With regard to communication networks (e.g., mobile communication systems), various initiatives exist to transition to an all-IP packet core. For example, Third Generation Partnership Project Long Term Evolution (3GPP LTE) standards in release 8 disclose an Evolved Packet Core (EPC) that operates as part of an all-IP network (AIPN) to process packets. AIPN implementations and research are generally considered beneficial in for communication networks that also contend with legacy circuit switching technology.

In other aspects of the domain of network architecture, there is an ongoing research trend, both in industry and academia, directed toward exploring the possibility of implementing software-defined networking (SDN) and network functions virtualization (NFV) for at least a portion of a network. Primary motivations for such a transition are a reduction of the custom hardware costs and performance enhancement.

BRIEF DESCRIPTION OF THE DRAWINGS

Numerous aspects, embodiments, objects and advantages of the present invention will be apparent upon consideration of the following detailed description, taken in conjunction with the accompanying drawings, in which like reference characters refer to like parts throughout, and in which.

DETAILED DESCRIPTION

Overview

Figure 1:
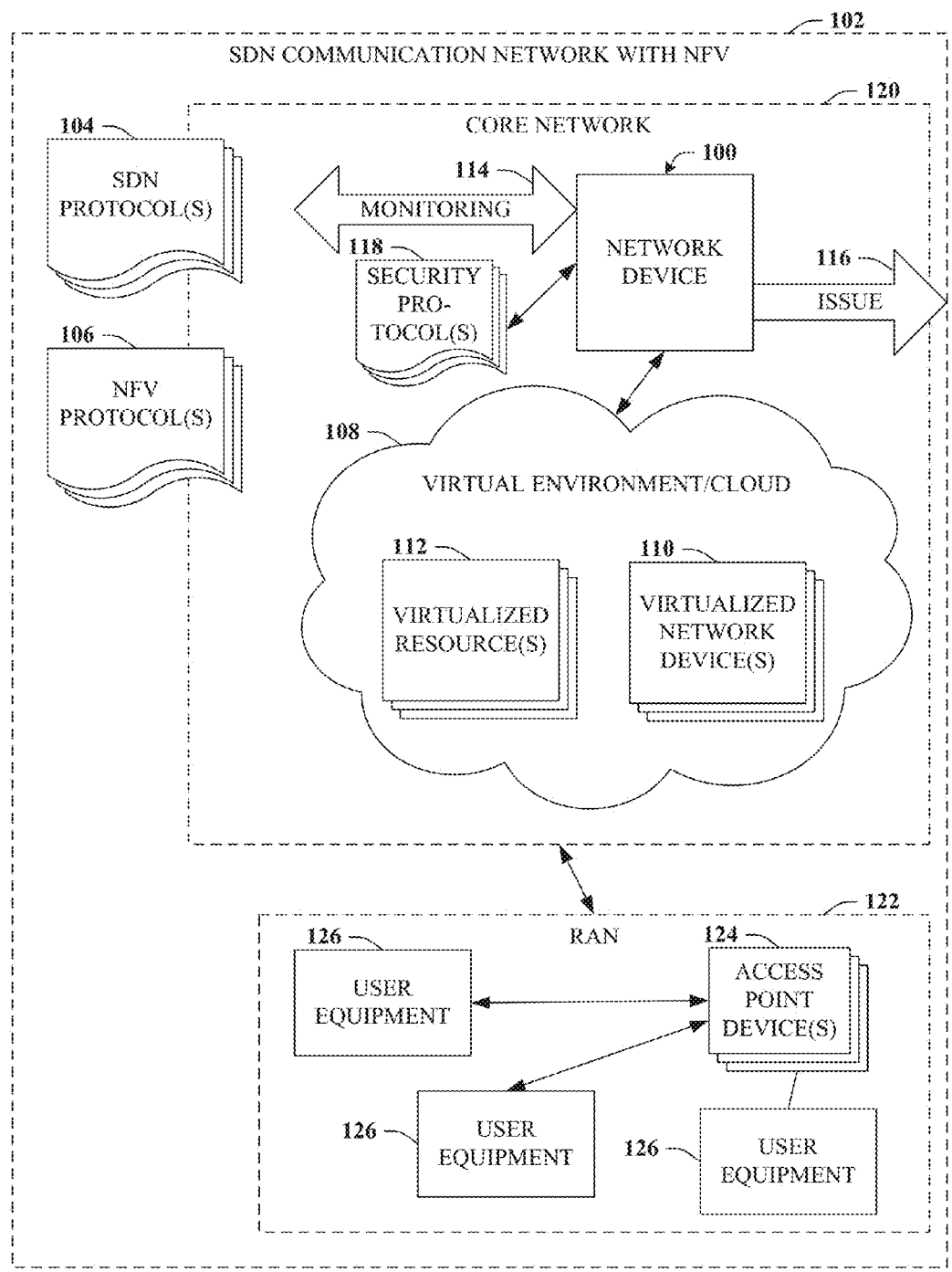
FIG. 1 illustrates a block diagram of an example system that can provide for security-based enhancements in connection with a communication network configured according to a software-defined networking architecture with network functions virtualization elements in accordance with certain embodiments of this disclosure.

In the domain of communication networks, an evolved packet core (EPC) that operates as part of an all-IP network (AIPN) to process packets is disclosed in release 8 of Third Generation Partnership Project Long Term Evolution (3GPP LTE) standard, which is incorporated herein by reference. Open Networking Foundation (ONF) released a white paper on Apr. 13, 2012, entitled "Software-Defined Networking: The New Norm for Networks," which is incorporated herein by reference. Aspects of the disclosed subject matter relate to security enhancements or advantages that can be provided in connection with a communication network (e.g., an LTE communication network) that operates at least in part according to a software-defined networking (SDN) architecture with network functions virtualization (NFV) elements.

As evidenced by the above, there is an ongoing research trend, both in industry and academia, directed toward exploring the possibility of implementing SDN and NFV for at least a portion of a communication network that is deployed in a cloud or virtual environment. Primary motivations for such a transition are a reduction of the custom hardware costs and performance enhancement.

NFV can be employed to virtualize components (e.g., nodes, switches, interfaces, etc.) of a network, wherein virtual machines located in a cloud or virtual environment can perform processing that was previously performed by the custom hardware devices these virtualized components replace. These virtual machines can be readily instantiated or destroyed in the cloud with very little effort and represent a separation of hardware from software. Hence, NFV can be implemented in connection with cloud-based computing instead of requiring localized custom hardware to perform the same functions. In an SDN architecture, the control plane conventionally used for communication networks is decoupled from the data plane, thus allowing services (such as those governed by NFV) to be managed abstractly and in a centralized manner. Network intelligence and state can be logically centralized, and the underlying network infrastructure can be abstracted from the executing applications. As a result, communication network carriers can gain enhanced programmability, automation, and network control, enabling them to build highly scalable, flexible networks that readily adapt to changing needs.

In the context of a communication network (e.g., mobile wireless network, wired telephone or data network, etc.) that is implemented according to SDN techniques or protocols, associated research focuses on lower costs and better throughput. However, there is little known research arguing that software-defined cellular networks also offer many potential security benefits. Such security benefits can be achieved, for example, by fully or partially deploying an LTE packet core network (e.g., an EPC) in the cloud.

The disclosed subject matter introduces both a technique to perform network security in cloud-based SDN/NFV networks and a specific system to protect communication networks from various security threats. In some embodiments, security threats can be identified by suitably equipped devices that, upon detection of the security threat, automatically trigger remedial action. Ideally, this remedial action in response to the security threat can be immediate and effective to prevent network degradation relating to performance or quality of service (QoS) for customers or other network users.

In this disclosure, "security" is intended to relate to a threshold associated with confidentiality, integrity, or availability (CIA) of network components or data maintained or otherwise associated with the communication network. Therefore, a "security threat" or "security issue" can be identified by a determination that a component (e.g., network device, virtualized device or resource, etc.) or data of the communication network is experiencing a threat to CIA. This determination can reflect or leverage a set of security protocols. Based on the type of the security threat identified (e.g., confidentiality, integrity, availability) the security protocols can trigger different remedial action.

For example, if the security issue relates to a confidentiality threat, then confidentiality protocols can be followed such as implementing or changing encryption parameters, renewing certificates, or the like. If the security issue relates to an integrity threat, then remedial action can be implemented to ensure data in a data store or in transit does not change inadvertently or in an unauthorized manner. If the security issue relates to availability, then remedial action can be directed to increasing resources relating to availability.

As one example, consider an overload event in which network traffic at a given node or interface (or another component) of a communication network passes a particular threshold. When network traffic surpasses the threshold, at some point the availability of network data or network services diminishes, either for the given component or in some cases the entire network. The security protocols can be configured to identify a potential availability security threat based on network traffic meeting or exceeding a given threshold. Once the security threat is identified, remedial action can be triggered automatically by system elements and without the need for technical staff to be deployed. For instance, upon detection of the security threat, instructions can be issued to assign or create additional cloud resources.

For example, additional computational resources (e.g., CPU) can be allocated to virtualized network devices responsible for processing packets, better enabling those virtualized network devices to handle the overload event. As another example, one or more virtualized network devices can be replicated, creating more virtualized network devices for processing the excess packets. It is understood that for an overload event, which is relatively common for communication networks, the cause might be due to a legitimate traffic spike or due to malicious attacks such as a distributed denial of service (DDoS) attack directed at a component of the communication network. Regardless of the cause or severity of the overload event, increasing virtualized resources in response can serve to mitigate negative effects relating to network performance or QoS. Eventually, traffic spikes will return to normal and malicious actors will run out of resources or give up.

In accordance with the disclosed subject matter, a cloud-based virtualized function can be provided that reacts to network traffic loads (signaling or data traffic) spikes at a given node or interface. The reaction of the network is managed by a cloud-based controller that triggers extra cloud resources to be assigned to the node or interface experiencing the overload event, noting that for cloud-based network infrastructure, resources are not limited to local fixed resources (e.g., network hardware or conventional overload prevention infrastructure). Once the overload event has passed, the network can elastically reduce cloud resources back to normal. Additional elements can be added to identify a source of the overload event, and in the case of a malicious attack, the threat can be blocked or otherwise mitigated.

Hence, in the meantime, for instance, while the overload event is occurring, additional virtualized resources can be created to facilitate determining a cause of the overload event. Such activity can be in accordance with various forensic security protocols. For example, in response to a detected security threat an image of a state of the communication network or a particular component can be captured as well as any suitable logging activity, which is further detailed herein.

It is understood that a network component that processes no or very little traffic might also signal a security issue. Hence, apart from exceeding a particular threshold of network traffic, if network traffic fails below a different threshold such can indicate that a network component is not functioning properly. In terms of mitigating this security issue, the potentially failing virtualized network device can be replicated with a new instance and the old one terminated. However, before the old instance is destroyed, an image can be captured for subsequent analysis, which represents another significant security-based improvement for SDN architectures.

Security Enhancements SDN/NFV Architectures

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter may be practiced without these specific details. In other instances, well-known structures and devices are shown in block diagram form in order to facilitate describing the disclosed subject matter.

Referring now to the drawing, with reference initially to FIG. 1, network device 100 is depicted. Network device 100 can provide for security-based enhancements in connection with a communication network configured according to a software-defined networking architecture with network functions virtualization elements. Generally, network device 100 can comprise a process and a memory that stores executable instructions that, when executed by the processor, facilitate performance of operations. Examples of the memory and processor can be found with reference to FIG. 11. It is to be appreciated that the computer 1102 can represent a server device of a communications network or a user equipment device and can be used in connection with implementing one or more of the systems or components shown and described in connection with FIG. 1 and other figures disclosed herein.

Network device 100 can be configured to monitor various components of a communication network 102 that includes network device 100. Communication network 102 can be configured according to a software-defined networking (SDN) protocol 104 and a network functions virtualization (NFV) protocol 106, which are maintained by communication network 102. SDN protocol 104 can define a set of rules relating at least to a separation of a control layer (e.g., a control plane) associated with communication network 102 from a forwarding layer (e.g., a data plane) associated with communication network 102. NFV protocols 106 defines a set of rules relating at least to functions of communication network 102 being provided in a virtual environment 108 (e.g., a cloud) comprising at least one virtualized network device 110.

In some embodiments, virtualized network device 110 can be instantiated by a virtual machine implemented on a server device. Virtualized network device 110 can provide for functionality typically associated with a specialized network hardware device, yet due to the virtualized implementation can instead operate on a high-performance commodity-based server. The specialized network hardware that is replaced by virtualized network device(s) 110 can be hardware typically associated with a core network of a communication network. Various examples relating to a specific embodiment of the disclosed subject matter can be found at FIG. 6.

As noted, network device 100 can provide for monitoring various components of communication network 102. Such monitoring is depicted as reference numeral 114, and can be directed to any suitable component of communication network 102, including components of core network 120 (e.g., virtualized network device(s) 110 or associated physical devices) or components of radio access network (RAN) 122 such as access point device(s) 124 (e.g., an eNodeB device, a femtocell device, a WI-FI access device, etc.) or user equipment 126 (e.g., a mobile phone, tablet, computer, recording device, sensor, etc.).

In response to monitoring 114, network device 100 can determine an information security issue 116 based on a set of security protocols 118. Security issue 116 can also be referred to herein as a security threat 116. Various examples of set of security protocols 118 can be found with reference to FIG. 2A and examples that, according to security protocols 118, might trigger an information security issue can be found in connection with FIG. 2B.

Figure 2A:
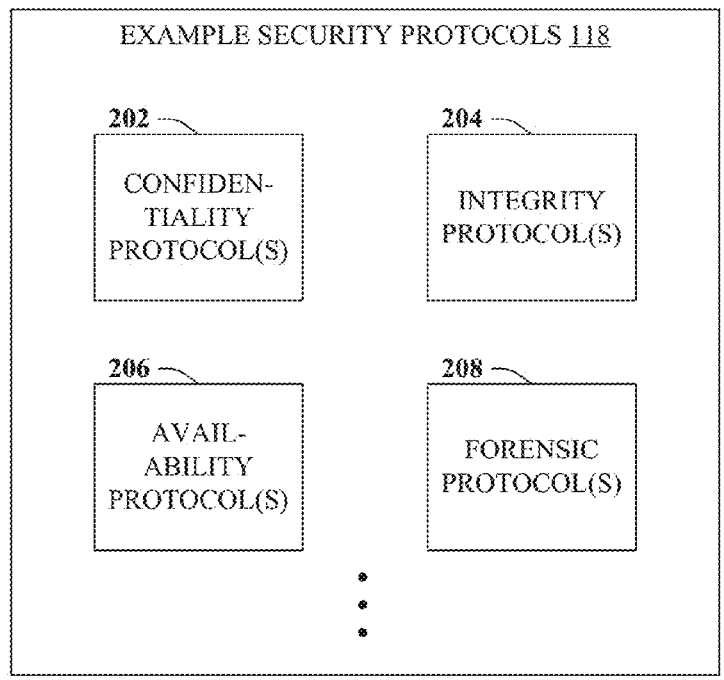
FIG. 2A illustrates a block diagram illustration of several examples of the security protocols in accordance with certain embodiments of this disclosure.
Figure 2B:
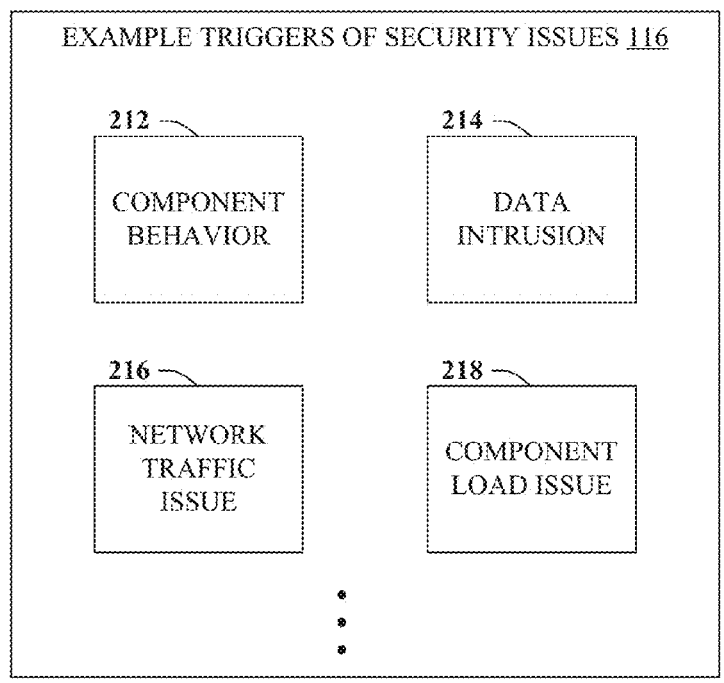
FIG. 2B illustrates a block diagram illustration of various examples of events identified by the monitoring that can trigger the security issue in accordance with certain embodiments of this disclosure.

While still referring to FIG. 1, but turning now as well to FIGS. 2A and 2B, illustrations 200 and 210 are depicted. Illustration 200 provides for several examples of the security protocols 118. Generally, security protocols 118 can be conceptually categorized in terms of confidentiality, integrity, and availability (CIA). Confidentiality protocols 202 can relate to promoting a determined degree of confidentiality for data traversing and/or maintained by communication network 102 or for services provided by communication network 102. For example, determining that data or a service provided by communication network 102 was accessed by an unauthorized entity can invoke a confidentiality-based security issue 116. Integrity protocols 204 can relate to preserving accuracy and consistency of data maintained by communication network 102. For example, determining that data traversing communication network 102 is improperly modified in transit or that data maintained by communication network 102 is improperly modified (e.g., due to malicious entities, failing memory devices, memory endurance/longevity thresholds, etc.) can invoke an integrity-based security issue 116. Availability protocols 206 can relate to preserving access to data or services maintained by communication network 102. For example, determining that information or services are not available upon request can invoke an availability-based security issue 116.

Furthermore, set of security protocols 118 can also include forensic protocols 208 that do not necessarily relate to identifying a particular security issue 116. Rather, forensic protocols 208 can be applied in response to security issue 116 being identified (e.g., one that violates CIA). In some embodiments, forensic protocols 208 need not provide immediate and automatic actions directed to mitigating the security issue 116 (as is typically the case otherwise), but can perform logging actions that can store data useful for learning more about the security issue 116.

Such logging or other forensic activity can be particularly useful for SDN architectures since the forensic activity can be selectively implemented. Given that SDN architectures routinely create and destroy virtualized instances of network resources, logging all activity or running complex detection or scrubbing algorithms at all times is infeasible, if not impossible. On the other hand, once a virtualized instance has been destroyed, data necessary for conducting forensic activity is usually lost. By conducting the forensic activity on-demand (e.g., in response to a detected security threat 116), forensic activity (e.g., logging, etc) becomes feasible and advantageous. For example, consider the case in which a malicious piece of code or other entity infects a virtualized resource of an SDN network that causes the virtualized resource to malfunction. One advantage for SDN networks is that the malfunctioning virtual resource can be destroyed and a new instance (without the malicious entity) can be created. While the malicious entity no longer infects the newly created virtual resource, important information relating to, e.g., operation of the malicious entity, a source of the malicious entity, an insertion vector of the malicious entity, and so on is also lost. However, by capturing an image of the malfunctioning virtual resource prior to destruction, such information can be subsequently analyzed, which can also be determined based on forensic protocols 208.

Referring specifically to FIG. 2B, illustration 210 can provide for various examples of events identified by the monitoring 114 that can trigger the security issue 116. For example, monitoring 114 can relate to component behavior 212, which can relate to substantially any component of communication network 102 such as misbehaving user equipment 126, access point device 124, or virtualized network resource 110. As another example, monitoring 114 can relate to data intrusion 214 in which malicious or unexpected data is detected. Other examples include network traffic issue 216 (e.g., too much traffic, no traffic, etc.) associated with a given component of communication network 102 or component load issue 218 (e.g., processing resources are beyond a threshold capacity, no capacity, etc.) associated with a given component of communication network 102. Upon detection of anomalous component behavior 212, data intrusion 214, network traffic 216, or component load 218, a suitable security issue 116 can be identified, which can be handled according to other security protocols 118.

For example, still referring to FIG. 1, network component 100 can generate one or more virtualized resource(s) 112. Virtualized resource 112 can be constructed in virtual environment 108 and can be compliant with SDN protocols 104 and/or NFV protocols 106. Generally, virtualized resource 112 can operate in accordance with security protocols 118 to facilitate mitigation of information security issue 116. Various non-limiting examples of virtualized resource 112 can be found in connection with FIG. 3.

Figure 3:
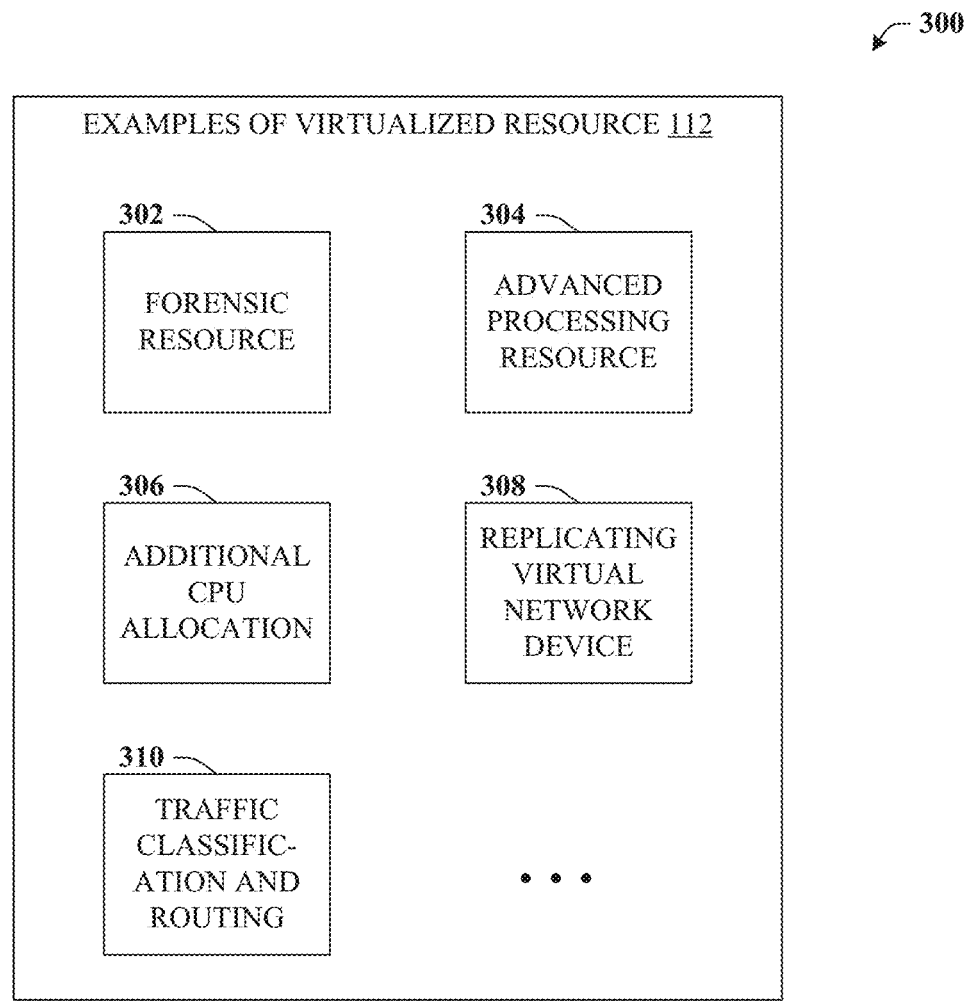
FIG. 3 illustrates a block diagram illustration of several examples of the virtualized resource that can be instantiated according to the security protocols in response to information the security issue being identified in accordance with certain embodiments of this disclosure.

Referring now to FIG. 3, illustration 300 is depicted. Illustration 300 provides for several examples of the virtualized resource 112 that can be instantiated according to the security protocols 118 in response to information the security issue 116 being identified. In some embodiments, virtualized resource 112 can be a forensic resource 302 such as or logging engine or other resource that operates to capture an image or log activities of communication network 102 or constituent components. As another example, virtualized resource 112 can relate to advanced processing resource 304 that can invoke sophisticated and potentially resource-intensive tracing or analysis procedures. Images or logs captured by forensic resource 302 or threat processing provided by advanced processing resource 304 can be invoked on-demand, e.g., only in response to determining the information security issue 116 and can be stored for later access or recall, such as to determine additional information about security issue 116. As a result, such images, logs, or threat processing can be as resource-intensive as necessary, given available resources are generally limited only by cloud resources, which is typically more robust than what is available to local resources of traditional networks, and such activity is likely to be rare.

In some embodiments, virtualized resource 112 can relate to assigning additional processing resources to virtualized network device 110 in response to the information security issue 116. For example, additional CPU allocation 306, additional caching or other memory resources, or the like can be provided in the same on-demand manner to a given virtualized network device 110 already functioning in virtual environment 108 of communication network 102. In some embodiments, virtualized resource 112 can relate to replicating a given virtualized network device 110 in response to the information security issue 116, which is represented by reference numeral 308. It is understood that replicating a given virtualized network device 110 can mitigate both an issue in which the virtualized network device 110 is not working (e.g., replace the malfunctioning instance) or when the virtualized network device 110 is overloaded (e.g., share a portion of the traffic and/or computational load). At any given time, virtual environment 108 can have multiple instances of many disparate types of virtualized network devices 110.

Another example of virtualized resource 112 can be traffic classification and routing 310. For example, in some embodiments, network device 100 can provide for categorizing network traffic associated with virtualized network device 110 into various subsets of network traffic. The categorizing can be based on a defined network traffic parameter indicated by security protocols 118. For instance, as discussed above, multiple instances of core network elements can be instantiated in virtual environment 108. A first instance of virtualized core network elements (e.g., virtualized network device(s) 110) can be dedicated to processing smart phone traffic (e.g., a first subset of network traffic identified by the categorizing), a second instances can be dedicated to the processing machine-to-machine (M2M) traffic (e.g., a second subset of network traffic), a third and fourth instance of core network elements can be dedicated to processing traffic and signaling originating from a sporting event (e.g., a third subset of network traffic), while a fifth instance can be dedicated to processing suspicious network traffic (e.g., a fourth subset of network traffic). Appreciably, when suspicious traffic is processed separately from other traffic, suspicious traffic is isolated from "good" traffic to some degree. If the suspicious traffic creates an issues (for example a saturation of a node or DDoS), only the associated instance of virtualized core network is affected, leaving other devices that process legitimate traffic unaffected and with unaffected QoS.

Figure 4A:
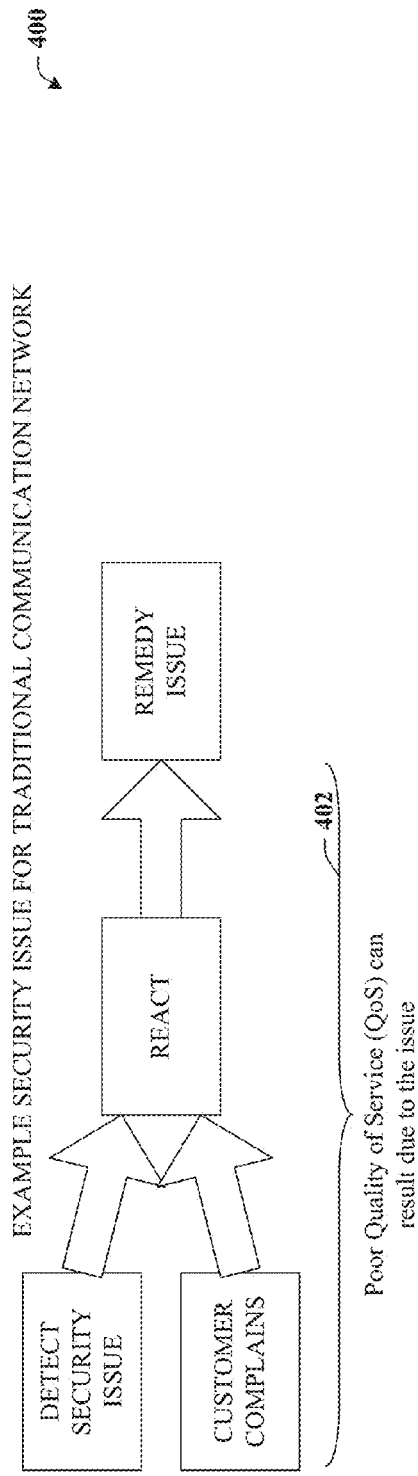
FIGS. 4A-B illustrate block diagrams that depict responses to security issues in a traditional communication network versus an embodiment of the disclosed communication network in accordance with certain embodiments of this disclosure.
Figure 4B:
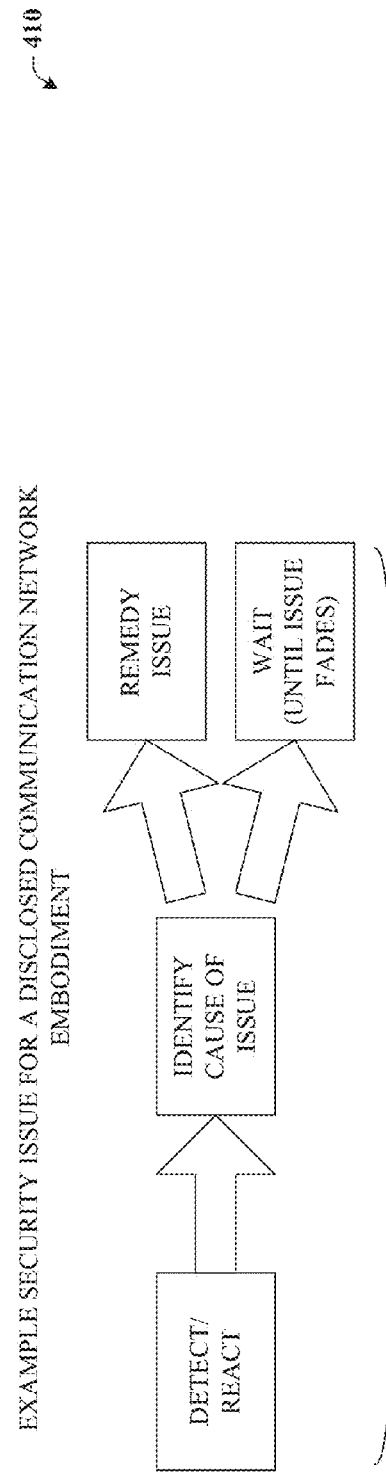

Turning now to FIGS. 4A and 4B, illustrations 400 and 410 that depict responses to security issues in a traditional communication network versus the disclosed communication network 102. Irrespective of the type of information security issue that arises, traditional communication networks implement a similar process for mitigating the issue, which is depicted by illustration 400 of FIG. 4A. In the case of a security issue being detected, which is not trivial and often not possible depending on the type of security issue involved, the network operators react to the threat and work on fixing the problem. In the case of a DDoS attack, appropriate measures are taken, re-routing the traffic through advanced and expensive scrubbers that mitigate the attack to a certain degree and redirect the legitimate traffic to its intended destination. It is important to note that until the problem is fixed, and especially during the delay it takes to activate the mitigation measures, QoS of network users is severely degraded and often the network is simply unavailable, as illustrated by reference numeral 402. Moreover, attacks and attackers get more sophisticated every year, which results in network operator increasing the already huge costs to purchase and maintain, for example, the complex anti-DDoS infrastructure.

The traditional security architecture in communication networks depicted illustration 400 does not always trigger the reaction against the security threat. More often than not it is a customer who calls in complaining that their network is down. Examples of this are the massive DDoS attacks against banking institutions of summer 2012. This situation is even worst as it is the customer who triggers the reaction and mitigation of the attack and, moreover, the QoS of the network users is impacted for a longer time.

Overall, with a traditional security architecture, an information security threat against a network with fixed resources both at the traffic/signaling layer as well as the scrubbing infrastructure, results in poor QoS for the customers as summarized. Moreover, in the case of DDoS attacks or similar, conventional remedies typically require scrubbing to be tuned to the attack. Tuning scrubbing equipment takes additional time and sometimes is still insufficient to fully avoid a negative QoS or other performance impact.

In contrast, communication network 102 that is designed as an SDN architecture with support for NFV and the security techniques and devices proposed herein can represent a transition to cloud-based communication networks for both wired and mobile wireless domains. Based on elements disclosed herein, not only are attacks and overload anomalies mitigated, but the impact on customers and network users is minimized if not completely obviated, as illustrated by reference numeral 412.

For example, and with specific reference to illustration 410 of FIG. 4B, instead of waiting for security issue 116 to be detected by traditional means or a customer calling to complain, the cloud-based network can continuously monitor network components and, in response to detecting a security issue 116, implement a virtualized function to react to the security issue 116. Continuing the example above, in the context of a DDoS attack, the load (signaling or data traffic) spikes at any node or interface can be detected by network device 100, e.g., based on comparing various monitored parameters to appropriate thresholds. The reaction of the network can be managed by network device 100, which can trigger extra cloud resources to be assigned to the node or interface experiencing the overload anomaly. In this regard, network operation can continue as normal, at least insofar was users are concerned. Note that, on a cloud-based network infrastructure, this network function to mitigate the security issue is not limited by the fixed network resources (e.g., hardware) and/or fixed resources of scrubbing infrastructure. The SDN architecture provides great flexibility and potential to tackle all types of overload anomalies as well as many other types of security threats.

Once the network has reacted against a security issue, further work can be done to detect and identify the cause of the security issue, which in the case of an overload event could be originated by, for example, a malicious DDoS attack or a legitimate spike in traffic. It is understood that steps relating to identifying a cause of the issue can be optional, since the issue can go away over time. Regardless, once the origin of the security issue is detected, actions can be taken to stop the security issue. In the case of an attack, the attack can be blocked or one can just wait. Given that the attack is not resulting in any QoS impact (e.g., since appropriate cloud resources have been ramped up), eventually the attacker will give up. It is significant to note that, as stated above, while the network identifies the origin of the security issue, the enhanced cloud resources result in no effects on network performance and customer QoS. Effectively, the network users are not even aware that an overload anomaly is occurring.

Figure 5:
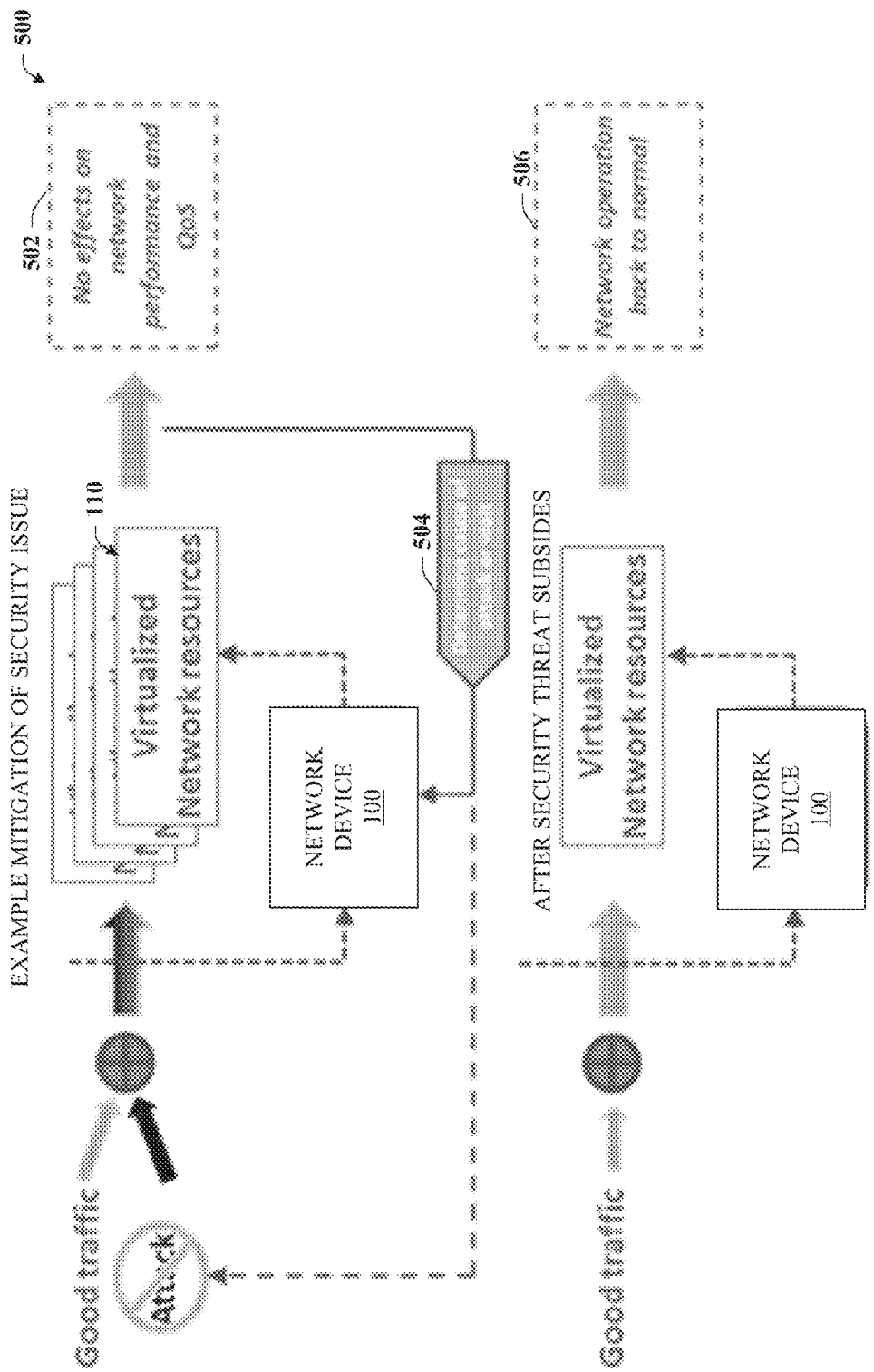
FIG. 5 illustrates a block diagram of an example system that can provide for a dynamic illustration in connection with an example security issue mitigation procedure in accordance with certain embodiments of this disclosure.

Referring now to FIG. 5, system 500 is depicted. System 500 provides a dynamic illustration in connection with an example security issue mitigation procedure. System 500 can include network device 100, which, as previously described in connection with FIG. 1, can facilitate monitoring 114 of components of an SDN-based communication network such as, e.g., virtualized network resources 110. In response to monitoring 114, information security issue 116 can be determined based on security protocols 118. Network device 100 can further generate an additional virtualized resource (e.g., virtualized resource 112) in order to mitigate the security issue 116.

In this example, security issue 116 is a DDoS attack such that both good traffic and malicious traffic are being processed by one or more virtualized network resources 110. In response to the attack, the virtualized resource 112 is represented by replicated additional virtualized network resources 110 until all traffic, both good and malicious is processed and, as indicated by reference numeral 502, no effects on network performance or QoS are perceived by users. Optionally, in addition to creating additional virtualized network resources 110, network device can also instantiate another virtualized resource 112 aimed at determining a cause of the security issue, in this case a DDoS attack, as depicted by reference numeral 504.

Once network device 100 determines the cause of the security issue, this threat can be blocked or mitigated. Such can be accomplished according to a variety of procedures directed to, e.g., remotely remove malicious apps from infected phones, block certain originating Internet protocol (IP) addresses or international mobile subscriber identities (IMSIs) or block specific subscriber identity module (SIM) cards, in the case of a mobile network security issue. Alternatively, in the case of an attack, eventually the attacker gives up as the attack is not affecting the network operation. Either way, eventually traffic due to the attack ceases, and system 500 can revert back to a state suitable for communication network 102 after the security threat subsides, as illustrated in the lower portion of FIG. 5.

For example, once the attack is blocked or the attacker gave up, the network can elastically reduce the cloud resources back to the initial state and the network operation is back to normal, as illustrated by reference numeral 506. In this regard, previously added virtualized resource 112 can be eliminated in response to determining the information security issue 116 has subsided or been mitigated. Network operation can still be controlled by network device 100, which can continue monitoring 114.

Figure 6:
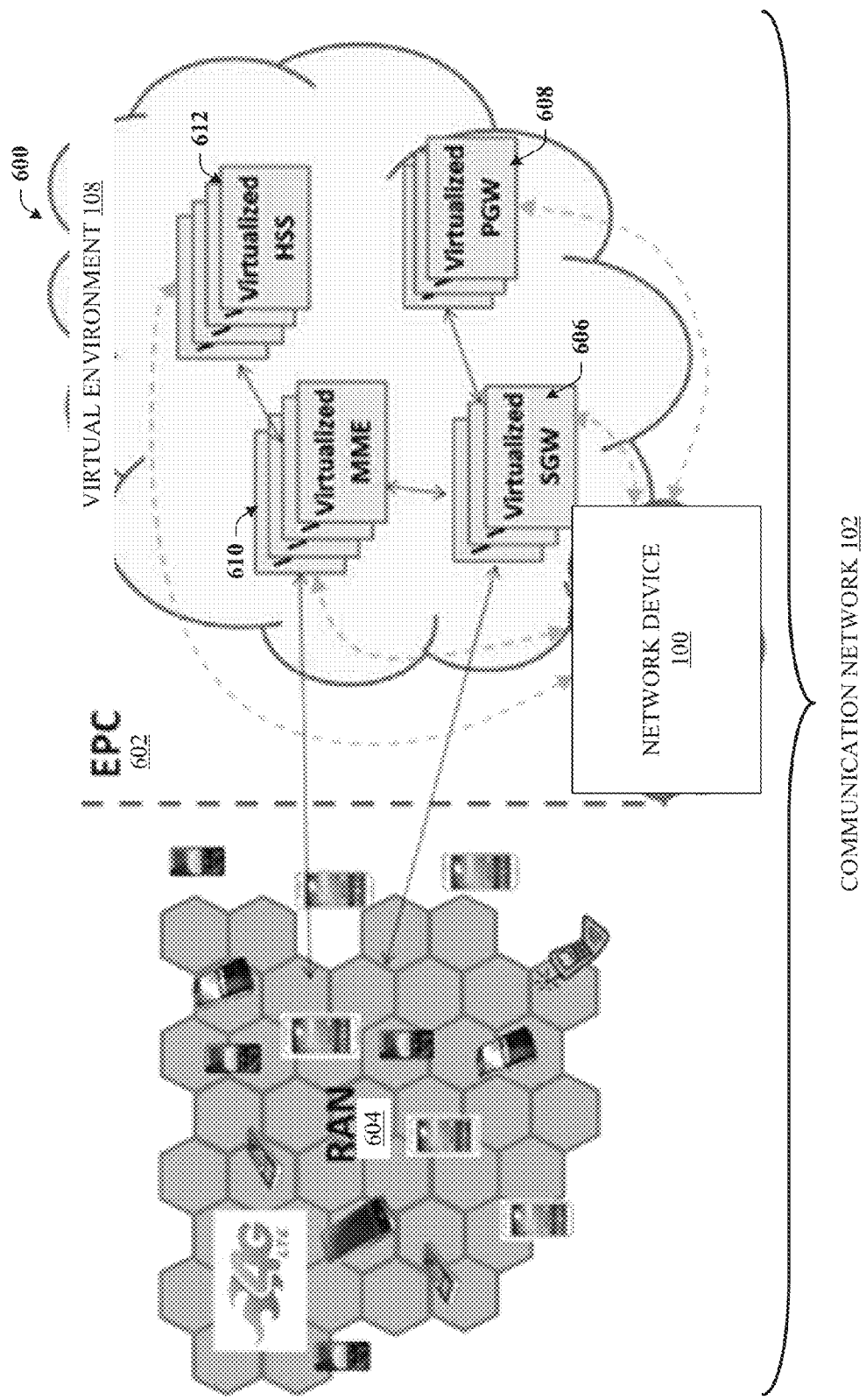
FIG. 6 illustrates a block diagram of an example system illustrating an example of the communication network configured according to an SDN/NFV architecture that is implemented according to LTE standards in accordance with certain embodiments of this disclosure.

Turning now to FIG. 6, system 600 is provided. System 600 illustrates an example of the communication network 102 configured according to an SDN/NFV architecture that is implemented according to LTE standards. For example, 3GPP LTE, which is commonly marketed as "4G", details an evolved packet core (EPC) that can be deployed as part of an all-IP network (AIPN). To support the EPC defined by LTE standards, communication network 102 can deploy the EPC 602 in virtual environment 108. Thus, EPC 602 can be implemented as a virtualized EPC that operates in the cloud. Constituent components of EPC 602, as defined by LTE standards, can be constructed in the cloud as virtualized network resources 110. RAN 604 can be substantially similar to RAN 122 of FIG. 1. As detailed herein, network device 100 can monitor or otherwise control components of EPC 602 as well as other components of communication network 102.

For example, in some embodiments, the virtualized evolved packet core 602 comprises a virtualized serving gateway 606 that functions as a virtualized instance of a serving gateway device according to the long term evolution standards. In some embodiments, the virtualized evolved packet core 602 comprises a virtualized packet data network gateway 608 that functions as a virtualized instance of a packet data network gateway device according to the long term evolution standards. In some embodiments, the virtualized evolved packet core 602 comprises a virtualized mobility management entity 610 that functions as a virtualized instance of a mobility management entity device according to the long term evolution standards. In some embodiments, the virtualized evolved packet core 602 comprises a virtualized home subscriber server 612 that functions as a virtualized instance of a home subscriber server device according to the long term evolution standards. Apart from the several examples described, other suitable elements defined by LTE standards can be virtualized and operated in virtual environment 108.

According to techniques described herein, upon detection of a security threat such as, e.g., an ongoing DDoS attack or signaling overload event in a cloud-based LTE network, network component 100 can mitigate the impact of the threat. Based on the disclosed subject matter, a virtualized LTE network can elastically assign more computational resources (e.g., in the form of virtual machines and CPU resources assigned to each virtual machine) as the signaling load at a given node spikes. Although these actions alone do not prevent or stop the attack, given a large enough pool of cloud resources, such DDoS attack mitigation would enhance the resources of a given node or component (e.g., virtualized HSS 612) so that component will be able to successfully process the load. As a result, legitimate users do not experience any service disruption or decrease in experience QoS during the attack.

Once the attack subsides (e.g., is blocked via detection activities, or the attacker gives up), the cloud resources assigned to the component under attack can elastically return to a default state.

While the attack is being mitigated, the network might (e.g., automatically or by means of security analyst work) identify the offending malicious application, piece of malware, botnet, etc. Once a source for the security threat is identified, more details on the origin of the threat are determined, alternative mitigation procedures can be implemented. In this situation, any given component can be replicated in the cloud, assigning one to process legitimate traffic (with no QoS disruption) and the replica can be focused to processing suspicious traffic. It is understood that such an approach can also be applied to provide different types of service or QoS to different types of devices. For example, multiple instances of LTE core network elements can be instantiated in the cloud, dedicating one to smartphone traffic, another one to Machine to Machine (M2M) traffic and one to a spike of traffic and signaling originating at some sporting event.

Methods Enhancing Security for SDN/NFV Architectures

Figure 7:
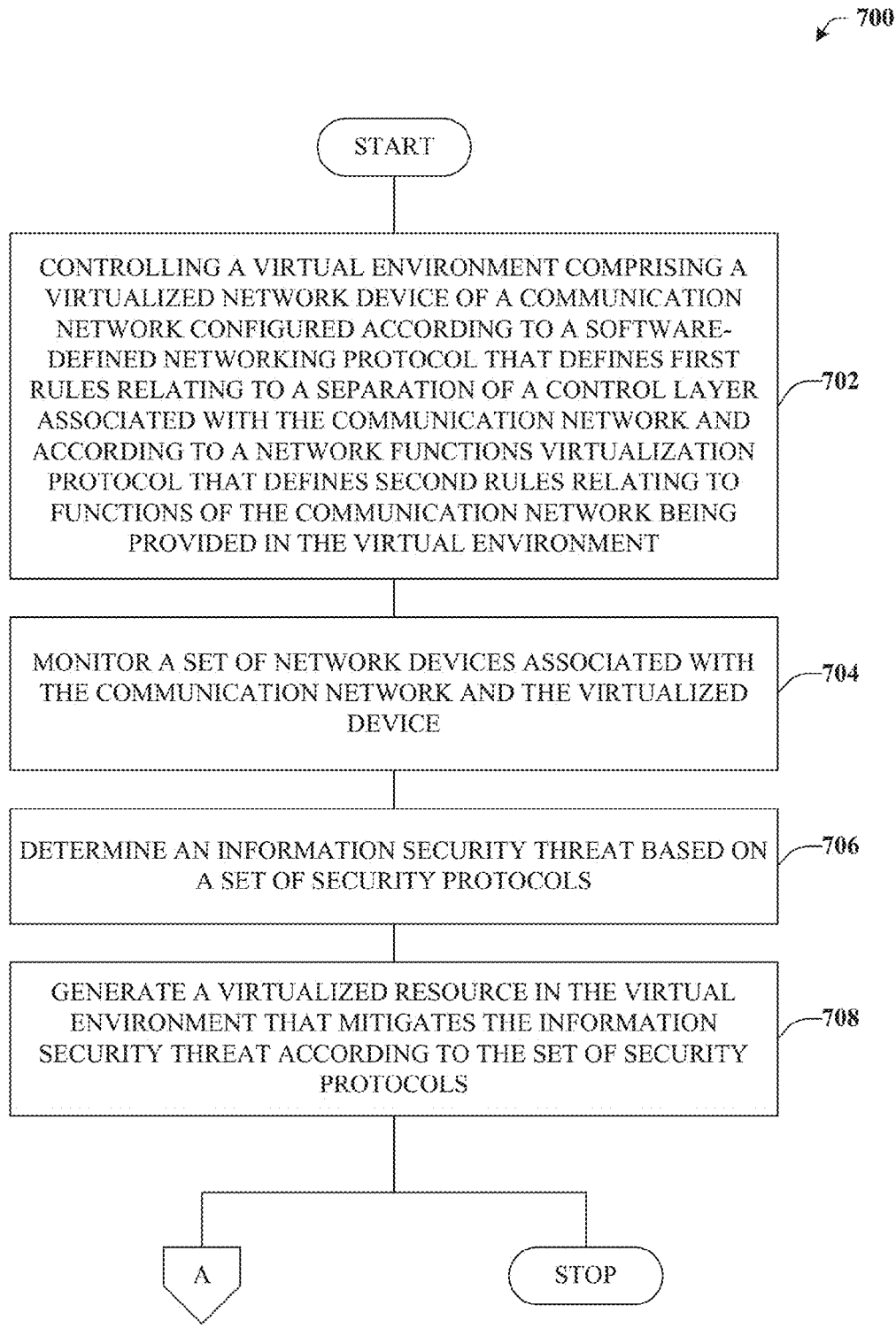
FIG. 7 illustrates an example methodology that can provide for security-based enhancements in connection with a communication network configured according to a software-defined networking architecture with network functions virtualization elements in accordance with certain embodiments of this disclosure.
Figure 8:
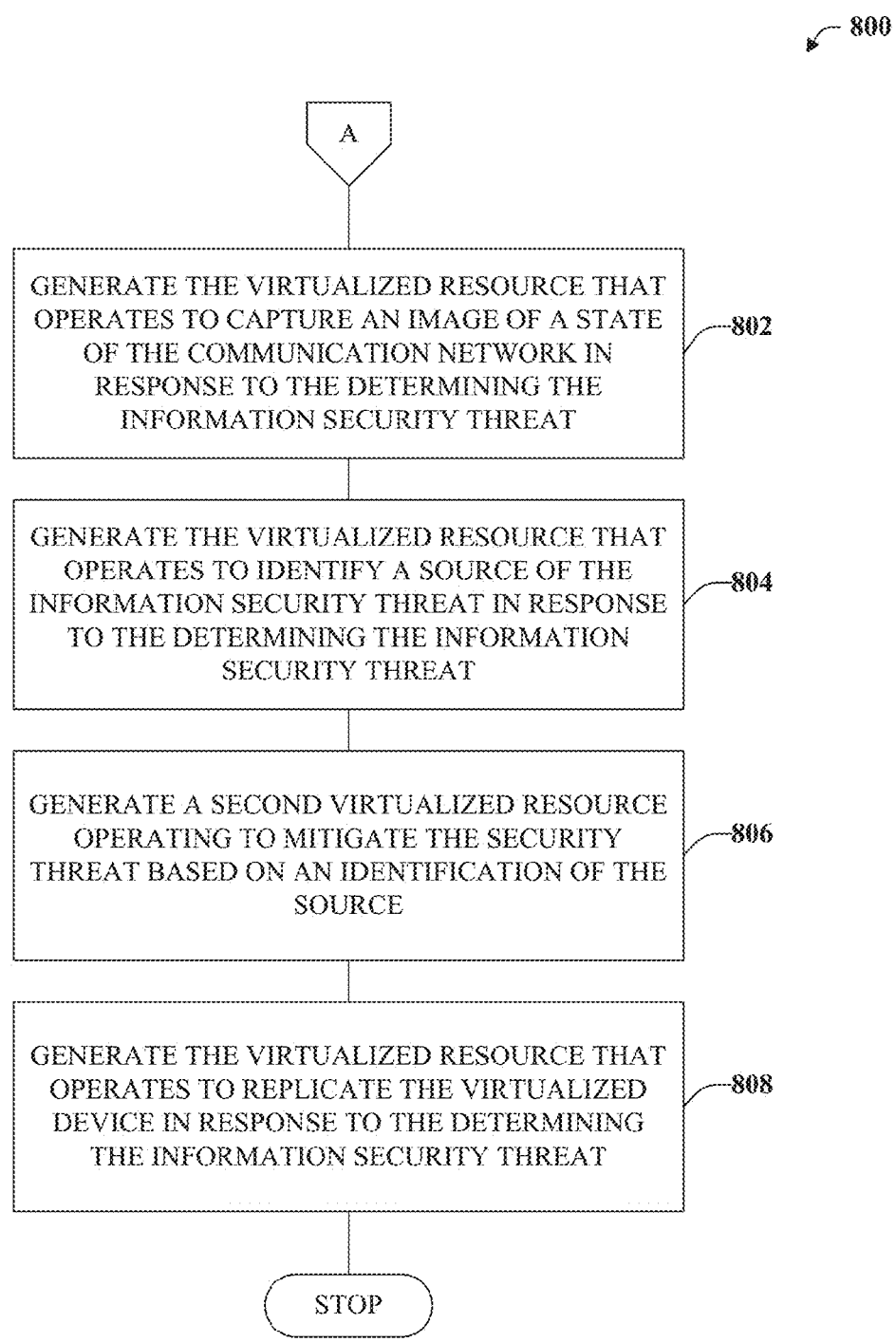
FIG. 8 illustrates an example methodology that can provide for additional features or aspects in connection with generating the virtualized resource in accordance with certain embodiments of this disclosure.

FIGS. 7 and 8 illustrate various methodologies in accordance with the disclosed subject matter. While, for purposes of simplicity of explanation, the methodologies are shown and described as a series of acts, it is to be understood and appreciated that the disclosed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the disclosed subject matter. Additionally, it should be further appreciated that the methodologies disclosed hereinafter and throughout this specification are capable of being stored on an article of manufacture to facilitate transporting and transferring such methodologies to computers.

Turning now to FIG. 7, exemplary method 700 is depicted. Method 700 can provide for security-based enhancements in connection with a communication network configured according to a software-defined networking architecture with network functions virtualization elements. For example, at reference numeral 702, a virtual environment comprising a virtualized network device of a communication network can be controlled. The communication network can be configured according to a software-defined networking protocol that defines first rules relating to a separation of a control layer associated with the communication network from a forwarding layer associated with the communication network and according to a network functions virtualization protocol that defines second rules relating to functions of the communication network being provided in the virtual environment.

At reference numeral 704, the virtualized device and a set of network devices associated with the communication network can be monitored. At reference numeral 706, an information security threat can be determined based on a set of security protocols. At reference numeral 708, a virtualized resource can be generated in the virtual environment. The virtualized resource can be generated to mitigate the information security threat according to the set of security protocols. Method 700 can proceed to insert A, which is further detailed in connection with FIG. 8, or end.

With reference now to FIG. 8, exemplary method 800 is illustrated. Method 800 can provide for additional features or aspects in connection with generating the virtualized resource. For example, reference numeral 708 of FIG. 7 details that a virtualized resource is generated. Regarding method 800, at reference numeral 802, the generated virtualized resource can operate to capture an image of a state of the communication network in response to the determining the information security threat as detailed in connection with reference numeral 706 of FIG. 7.

At reference numeral 804, the generated virtualized resource can operate to identify a source of the information security threat in response to the determining the information security threat. At reference numeral 806, the generated virtualized resource can operate to mitigate the security threat based on the identification of the source detailed at reference numeral 804. At reference numeral 808, the generated virtualized resource can operate to replicate the virtualized device in response to the determining the information security threat.

For the sake of thoroughness, it should be understood that elements disclosed herein relate to security enhancement in the context of a communication network that is deployed according to an SDN/NFV architecture. Within this architecture, various security elements are described that are not well-understood, routine, or conventional activities previously known to the industry. The communication network comprises various network devices that perform functions that cannot be performed by humans and that are not mere implementations of well known or fundamental economic or human behavior. For example, disclosed network devices can electronically transmit and receive data packets. Moreover, claims appended hereto do not simply recite a fundamental economic practice, a method of organizing human activities, an idea of itself, or a mathematical relationship or formula.

Example Operating Environments

Figure 9:
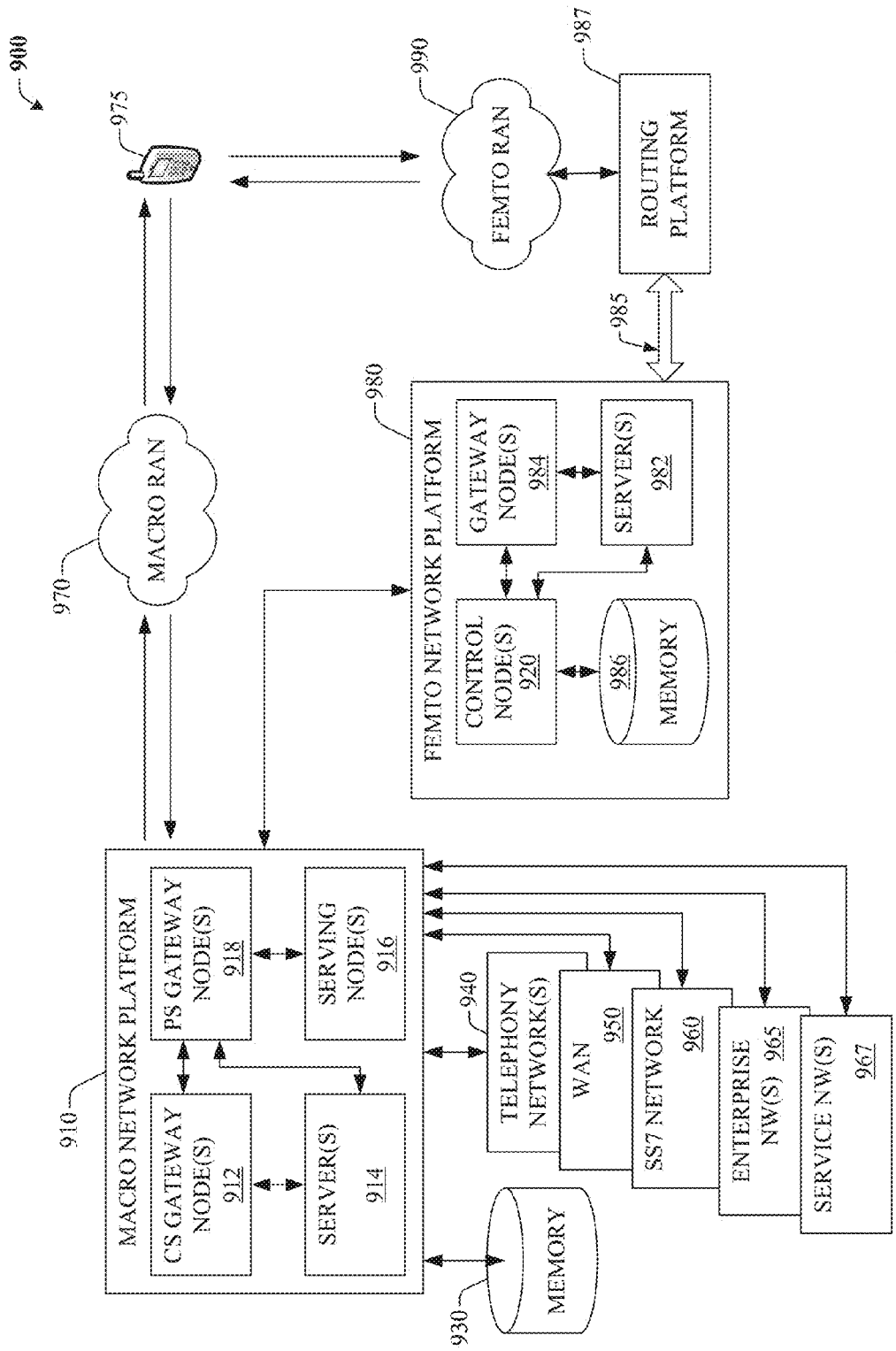
FIG. 9 illustrates a first example of a wireless communications environment with associated components that can be operable to execute certain embodiments of this disclosure.

To provide further context for various aspects of the subject specification, FIG. 9 illustrates an example wireless communication environment 900, with associated components that can enable operation of a femtocell enterprise network in accordance with aspects described herein. Wireless communication environment 900 comprises two wireless network platforms: (i) A macro network platform 910 that serves, or facilitates communication) with user equipment 975 via a macro radio access network (RAN) 970. It should be appreciated that in cellular wireless technologies (e.g., 4G, 3GPP UMTS, HSPA, 3GPP LTE, 3GPP UMB), macro network platform 910 is embodied in a Core Network. (ii) A femto network platform 980, which can provide communication with UE 975 through a femto RAN 990, linked to the femto network platform 980 through a routing platform 910 via backhaul pipe(s) 985. It should be appreciated that femto network platform 980 typically offloads UE 975 from macro network, once UE 975 attaches (e.g., through macro-to-femto handover, or via a scan of channel resources in idle mode) to femto RAN.

It is noted that RAN comprises base station(s), or access point(s), and its associated electronic circuitry and deployment site(s), in addition to a wireless radio link operated in accordance with the base station(s). Accordingly, macro RAN 970 can comprise various coverage cells, while femto RAN 990 can comprise multiple femto access points or multiple metro cell access points. As mentioned above, it is to be appreciated that deployment density in femto RAN 990 can be substantially higher than in macro RAN 970.

Generally, both macro and femto network platforms 910 and 980 comprise components, e.g., nodes, gateways, interfaces, servers, or platforms, that facilitate both packet-switched (PS) (e.g., internet protocol (IP), frame relay, asynchronous transfer mode (ATM)) and circuit-switched (CS) traffic (e.g., voice and data) and control generation for networked wireless communication. In an aspect of the subject innovation, macro network platform 910 comprises CS gateway node(s) 912 which can interface CS traffic received from legacy networks like telephony network(s) 940 (e.g., public switched telephone network (PSTN), or public land mobile network (PLMN)) or a SS7 network 960. Circuit switched gateway 912 can authorize and authenticate traffic (e.g., voice) arising from such networks. Additionally, CS gateway 912 can access mobility, or roaming, data generated through SS7 network 960; for instance, mobility data stored in a VLR, which can reside in memory 930. Moreover, CS gateway node(s) 912 interfaces CS-based traffic and signaling and gateway node(s) 918. As an example, in a 3GPP UMTS network, gateway node(s) 918 can be embodied in gateway GPRS support node(s) (GGSN).

In addition to receiving and processing CS-switched traffic and signaling, gateway node(s) 918 can authorize and authenticate PS-based data sessions with served (e.g., through macro RAN) wireless devices. Data sessions can comprise traffic exchange with networks external to the macro network platform 910, like wide area network(s) (WANs) 950; it should be appreciated that local area network(s) (LANs) can also be interfaced with macro network platform 910 through gateway node(s) 918. Gateway node(s) 918 generates packet data contexts when a data session is established. To that end, in an aspect, gateway node(s) 918 can comprise a tunnel interface (e.g., tunnel termination gateway (TTG) in 3GPP UMTS network(s); not shown) which can facilitate packetized communication with disparate wireless network(s), such as Wi-Fi networks. It should be further appreciated that the packetized communication can comprise multiple flows that can be generated through server(s) 914. It is to be noted that in 3GPP UMTS network(s), gateway node(s) 918 (e.g., GGSN) and tunnel interface (e.g., TTG) comprise a packet data gateway (PDG).

Macro network platform 910 also comprises serving node(s) 916 that convey the various packetized flows of information or data streams, received through gateway node(s) 918. As an example, in a 3GPP UMTS network, serving node(s) can be embodied in serving GPRS support node(s) (SGSN).

As indicated above, server(s) 914 in macro network platform 910 can execute numerous applications (e.g., location services, online gaming, wireless banking, wireless device management . . . ) that generate multiple disparate packetized data streams or flows, and manage (e.g., schedule, queue, format . . . ) such flows. Such application(s), for example can comprise add-on features to standard services provided by macro network platform 910. Data streams can be conveyed to gateway node(s) 918 for authorization/authentication and initiation of a data session, and to serving node(s) 916 for communication thereafter. Server(s) 914 can also effect security (e.g., implement one or more firewalls) of macro network platform 910 to ensure network's operation and data integrity in addition to authorization and authentication procedures that CS gateway node(s) 912 and gateway node(s) 918 can enact. Moreover, server(s) 914 can provision services from external network(s), e.g., WAN 950, or Global Positioning System (GPS) network(s) (not shown). It is to be noted that server(s) 914 can comprise one or more processor configured to confer at least in part the functionality of macro network platform 910. To that end, the one or more processor can execute code instructions stored in memory 930, for example.

In example wireless environment 900, memory 930 stores information related to operation of macro network platform 910. Information can comprise business data associated with subscribers; market plans and strategies, e.g., promotional campaigns, business partnerships; operational data for mobile devices served through macro network platform; service and privacy policies; end-user service logs for law enforcement; and so forth. Memory 930 can also store information from at least one of telephony network(s) 940, WAN(s) 950, or SS7 network 960, enterprise NW(s) 965, or service NW(s) 967.

Femto gateway node(s) 984 have substantially the same functionality as PS gateway node(s) 918. Additionally, femto gateway node(s) 984 can also comprise substantially all functionality of serving node(s) 916. In an aspect, femto gateway node(s) 984 facilitates handover resolution, e.g., assessment and execution. Further, control node(s) 920 can receive handover requests and relay them to a handover component (not shown) via gateway node(s) 984. According to an aspect, control node(s) 920 can support RNC capabilities.

Server(s) 982 have substantially the same functionality as described in connection with server(s) 914. In an aspect, server(s) 982 can execute multiple application(s) that provide service (e.g., voice and data) to wireless devices served through femto RAN 990. Server(s) 982 can also provide security features to femto network platform. In addition, server(s) 982 can manage (e.g., schedule, queue, format . . . ) substantially all packetized flows (e.g., IP-based) it generates in addition to data received from macro network platform 910. It is to be noted that server(s) 982 can comprise one or more processor configured to confer at least in part the functionality of macro network platform 910. To that end, the one or more processor can execute code instructions stored in memory 986, for example.

Memory 986 can comprise information relevant to operation of the various components of femto network platform 980. For example operational information that can be stored in memory 986 can comprise, but is not limited to, subscriber information; contracted services; maintenance and service records; femto cell configuration (e.g., devices served through femto RAN 990; access control lists, or white lists); service policies and specifications; privacy policies; add-on features; and so forth.

It is noted that femto network platform 980 and macro network platform 910 can be functionally connected through one or more reference link(s) or reference interface(s). In addition, femto network platform 980 can be functionally coupled directly (not illustrated) to one or more of external network(s) 940, 950, 960, 965 or 967. Reference link(s) or interface(s) can functionally link at least one of gateway node(s) 984 or server(s) 986 to the one or more external networks 940, 950, 960, 965 or 967.

Figure 10:
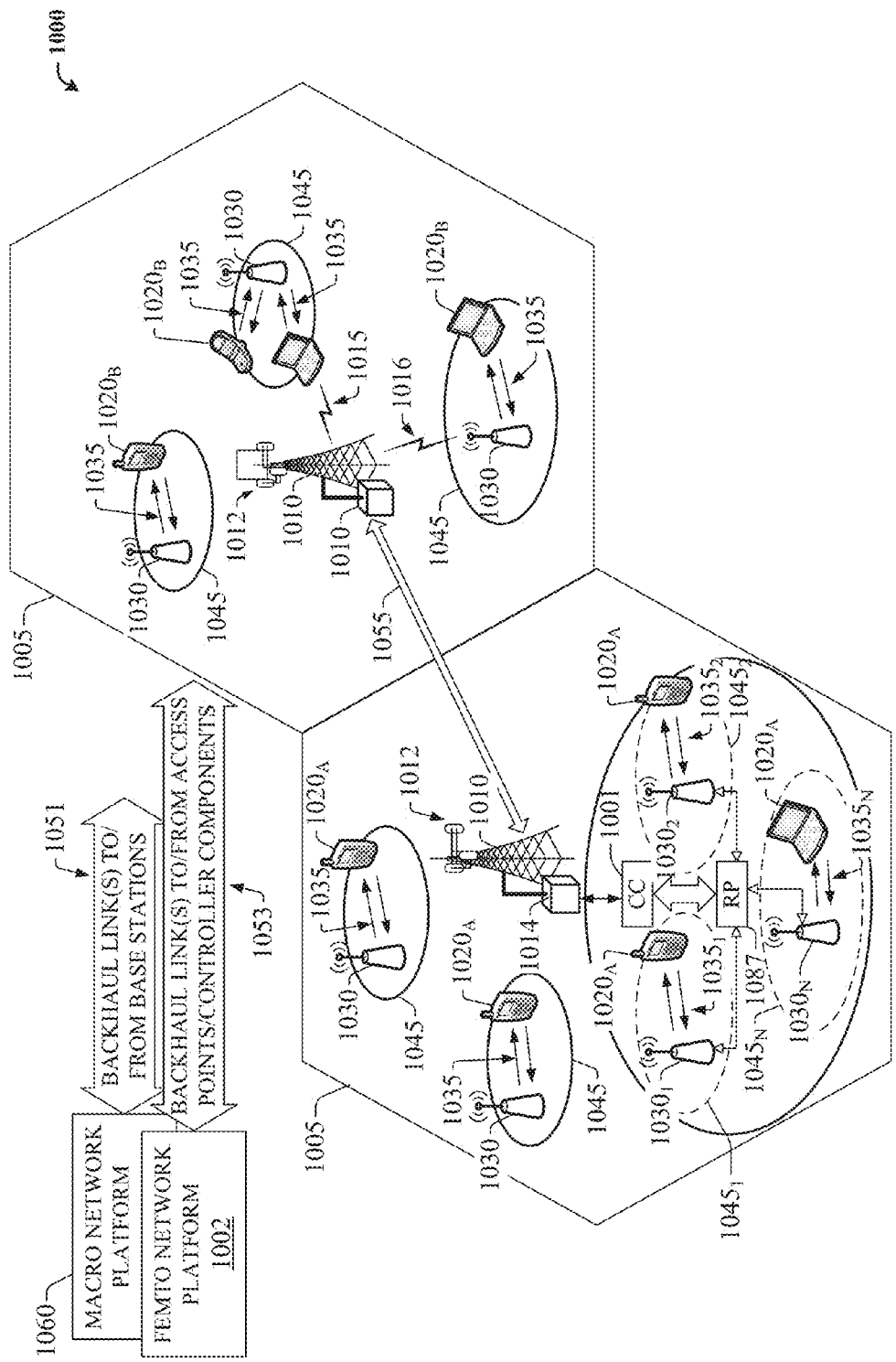
FIG. 10 illustrates a second example of a wireless communications environment with associated components that can be operable to execute certain embodiments of this disclosure.

FIG. 10 illustrates a wireless environment that comprises macro cells and femtocells for wireless coverage in accordance with aspects described herein. In wireless environment 1005, two areas represent "macro" cell coverage; each macro cell is served by a base station 1010. It can be appreciated that macro cell coverage area 1005 and base station 1010 can comprise functionality, as more fully described herein, for example, with regard to system 1000. Macro coverage is generally intended to serve mobile wireless devices, like UE 1020$_A$, 1020$_B$, in outdoors locations. An over-the-air (OTA) wireless link 1035 provides such coverage, the wireless link 1035 comprises a downlink (DL) and an uplink (UL), and utilizes a predetermined band, licensed or unlicensed, of the radio frequency (RF) spectrum. As an example, UE 1020$_A$, 1020$_E$ can be a 3GPP Universal Mobile Telecommunication System (UMTS) mobile phone. It is noted that a set of base stations, its associated electronics, circuitry or components, base stations control component(s), and wireless links operated in accordance to respective base stations in the set of base stations form a radio access network (RAN). In addition, base station 1010 communicates via backhaul link(s) 1051 with a macro network platform 1060, which in cellular wireless technologies (e.g., 3rd Generation Partnership Project (3GPP) Universal Mobile Telecommunication System (UMTS), Global System for Mobile Communication (GSM)) represents a core network.

In an aspect, macro network platform 1060 controls a set of base stations 1010 that serve either respective cells or a number of sectors within such cells. Base station 1010 comprises radio equipment 1014 for operation in one or more radio technologies, and a set of antennas 1012 (e.g., smart antennas, microwave antennas, satellite dish(es) . . . ) that can serve one or more sectors within a macro cell 1005. It is noted that a set of radio network control node(s), which can be a part of macro network platform 1060; a set of base stations (e.g., Node B 1010) that serve a set of macro cells 1005; electronics, circuitry or components associated with the base stations in the set of base stations; a set of respective OTA wireless links (e.g., links 1015 or 1016) operated in accordance to a radio technology through the base stations; and backhaul link(s) 1055 and 1051 form a macro radio access network (RAN). Macro network platform 1060 also communicates with other base stations (not shown) that serve other cells (not shown). Backhaul link(s) 1051 or 1053 can comprise a wired backbone link (e.g., optical fiber backbone, twisted-pair line, T1/E1 phone line, a digital subscriber line (DSL) either synchronous or asynchronous, an asymmetric ADSL, or a coaxial cable . . . ) or a wireless (e.g., line-of-sight (LOS) or non-LOS) backbone link. Backhaul pipe(s) 1055 link disparate base stations 1010. According to an aspect, backhaul link 1053 can connect multiple femto access points 1030 and/or controller components (CC) 1001 to the femto network platform 1002. In one example, multiple femto APs can be connected to a routing platform (RP) 1087, which in turn can be connect to a controller component (CC) 1001. Typically, the information from UEs 1020$_A$ can be routed by the RP 1087, for example, internally, to another UE 1020$_A$ connected to a disparate femto AP connected to the RP 1087, or, externally, to the femto network platform 1002 via the CC 1001, as discussed in detail supra.

In wireless environment 1005, within one or more macro cell(s) 1005, a set of femtocells 1045 served by respective femto access points (APs) 1030 can be deployed. It can be appreciated that, aspects of the subject innovation can be geared to femtocell deployments with substantive femto AP density, e.g., $10^4$-$10^7$ femto APs 1030 per base station 1010. According to an aspect, a set of femto access points 1030$_1$-1030$_N$, with N a natural number, can be functionally connected to a routing platform 1087, which can be functionally coupled to a controller component 1001. The controller component 1001 can be operationally linked to the femto network platform 1002 by employing backhaul link(s) 1053. Accordingly, UE 1020$_A$ connected to femto APs 1030$_1$-1030$_N$ can communicate internally within the femto enterprise via the routing platform (RP) 1087 and/or can also communicate with the femto network platform 1002 via the RP 1087, controller component 1001 and the backhaul link(s) 1053. It can be appreciated that although only one femto enterprise is depicted in FIG. 10, multiple femto enterprise networks can be deployed within a macro cell 1005.

It is noted that while various aspects, features, or advantages described herein have been illustrated through femto access point(s) and associated femto coverage, such aspects and features also can be exploited for home access point(s) (HAPs) that provide wireless coverage through substantially any, or any, disparate telecommunication technologies, such as for example Wi-Fi (wireless fidelity) or picocell telecommunication. Additionally, aspects, features, or advantages of the subject innovation can be exploited in substantially any wireless telecommunication, or radio, technology; for example, Wi-Fi, Worldwide Interoperability for Microwave Access (WiMAX), Enhanced General Packet Radio Service (Enhanced GPRS), 3GPP LTE, 3GPP2 UMB, 3GPP UMTS, HSPA, HSDPA, HSUPA, or LTE Advanced. Moreover, substantially all aspects of the subject innovation can comprise legacy telecommunication technologies.

With respect to FIG. 10, in example embodiment 1000, base station AP 1010 can receive and transmit signal(s) (e.g., traffic and control signals) from and to wireless devices, access terminals, wireless ports and routers, etc., through a set of antennas 1012$_1$-1012$_N$. It should be appreciated that while antennas 1012$_1$-1012$_N$ are a part of communication platform 1025, which comprises electronic components and associated circuitry that provides for processing and manipulating of received signal(s) (e.g., a packet flow) and signal(s) (e.g., a broadcast control channel) to be transmitted. In an aspect, communication platform 1025 comprises a transmitter/receiver (e.g., a transceiver) 1066 that can convert signal(s) from analog format to digital format upon reception, and from digital format to analog format upon transmission. In addition, receiver/transmitter 1066 can divide a single data stream into multiple, parallel data streams, or perform the reciprocal operation. Coupled to transceiver 1066 is a multiplexer/demultiplexer 1067 that facilitates manipulation of signal in time and frequency space. Electronic component 1067 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 1067 can scramble and spread information (e.g., codes) according to substantially any code known in the art; e.g., Hadamard-Walsh codes, Baker codes, Kasami codes, polyphase codes, and so on. A modulator/demodulator 1068 is also a part of operational group 1025, and can modulate information according to multiple modulation techniques, such as frequency modulation, amplitude modulation (e.g., M-ary quadrature amplitude modulation (QAM), with M a positive integer), phase-shift keying (PSK), and the like.

Figure 11:
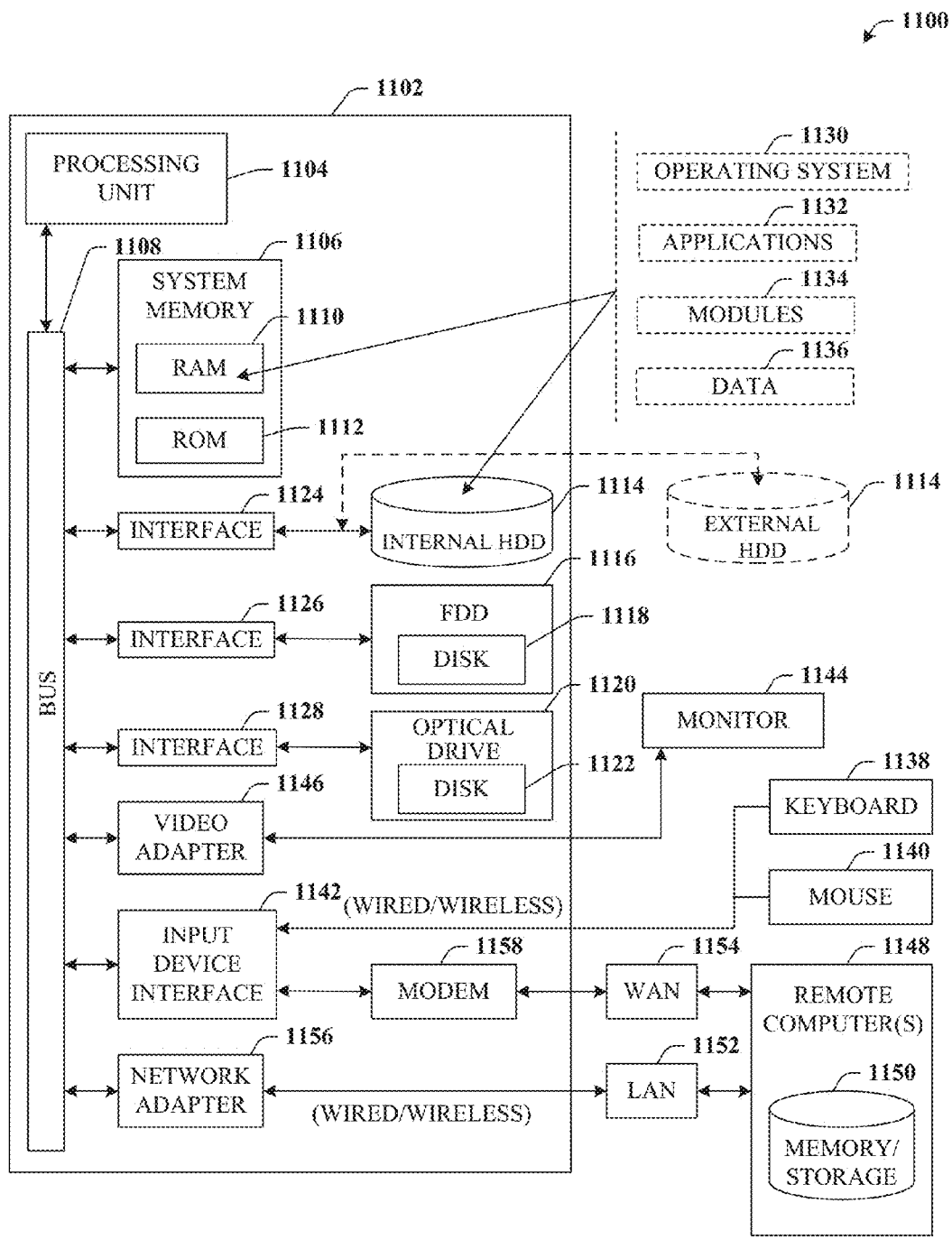
FIG. 11 illustrates an example block diagram of a computer operable to execute certain embodiments of this disclosure.

Referring now to FIG. 11, there is illustrated a block diagram of an exemplary computer system operable to execute the disclosed architecture. In order to provide additional context for various aspects of the disclosed subject matter, FIG. 11 and the following discussion are intended to provide a brief, general description of a suitable computing environment 1100 in which the various aspects of the disclosed subject matter can be implemented. Additionally, while the disclosed subject matter described above may be suitable for application in the general context of computer-executable instructions that may run on one or more computers, those skilled in the art will recognize that the disclosed subject matter also can be implemented in combination with other program modules and/or as a combination of hardware and software.

Generally, program modules comprise routines, programs, components, data structures, etc., that perform particular tasks or implement particular abstract data types. Moreover, those skilled in the art will appreciate that the inventive methods can be practiced with other computer system configurations, including single-processor or multi-processor computer systems, minicomputers, mainframe computers, as well as personal computers, hand-held computing devices, microprocessor-based or programmable consumer electronics, and the like, each of which can be operatively coupled to one or more associated devices.

The illustrated aspects of the disclosed subject matter may also be practiced in distributed computing environments where certain tasks are performed by remote processing devices that are linked through a communications network. In a distributed computing environment, program modules can be located in both local and remote memory storage devices.

A computer typically comprises a variety of computer-readable media. Computer-readable media can be any available media that can be accessed by the computer and comprises both volatile and nonvolatile media, removable and non-removable media. By way of example, and not limitation, computer-readable media can comprise computer storage media and communication media. Computer storage media can comprise either volatile or nonvolatile, removable and non-removable media implemented in any method or technology for storage of information such as computer-readable instructions, data structures, program modules or other data. Computer storage media comprises, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and comprises any information delivery media. The term "modulated data signal" means a signal that has one or more of its characteristics set or changed in such a manner as to encode information in the signal. By way of example, and not limitation, communication media comprises wired media such as a wired network or direct-wired connection, and wireless media such as acoustic, RF, infrared and other wireless media. Combinations of the any of the above should also be included within the scope of computer-readable media.

Still referring to FIG. 11, the exemplary environment 1100 for implementing various aspects of the disclosed subject matter comprises a computer 1102, the computer 1102 including a processing unit 1104, a system memory 1106 and a system bus 1108. The system bus 1108 couples to system components including, but not limited to, the system memory 1106 to the processing unit 1104. The processing unit 1104 can be any of various commercially available processors. Dual microprocessors and other multi-processor architectures may also be employed as the processing unit 1104.

The system bus 1108 can be any of several types of bus structure that may further interconnect to a memory bus (with or without a memory controller), a peripheral bus, and a local bus using any of a variety of commercially available bus architectures. The system memory 1106 comprises read-only memory (ROM) 1110 and random access memory (RAM) 1112. A basic input/output system (BIOS) is stored in a non-volatile memory 1110 such as ROM, EPROM, EEPROM, which BIOS contains the basic routines that help to transfer information between elements within the computer 1102, such as during start-up. The RAM 1112 can also comprise a high-speed RAM such as static RAM for caching data.

The computer 1102 further comprises an internal hard disk drive (HDD) 1114 (e.g., EIDE, SATA), which internal hard disk drive 1114 may also be configured for external use in a suitable chassis (not shown), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). The hard disk drive 1114, magnetic disk drive 1116 and optical disk drive 1120 can be connected to the system bus 1108 by a hard disk drive interface 1124, a magnetic disk drive interface 1126 and an optical drive interface 1128, respectively. The interface 1124 for external drive implementations comprises at least one or both of Universal Serial Bus (USB) and IEEE1394 interface technologies. Other external drive connection technologies are within contemplation of the subject matter disclosed herein.

The drives and their associated computer-readable media provide nonvolatile storage of data, data structures, computer-executable instructions, and so forth. For the computer 1102, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed subject matter.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. It is appreciated that the disclosed subject matter can be implemented with various commercially available operating systems or combinations of operating systems.

A user can enter commands and information into the computer 1102 through one or more wired/wireless input devices, e.g., a keyboard 1138 and a pointing device, such as a mouse 1140. Other input devices (not shown) may comprise a microphone, an IR remote control, a joystick, a game pad, a stylus pen, touch screen, or the like. These and other input devices are often connected to the processing unit 1104 through an input device interface 1142 that is coupled to the system bus 1108, but can be connected by other interfaces, such as a parallel port, an IEEE1394 serial port, a game port, a USB port, an IR interface, etc.

A monitor 1144 or other type of display device is also connected to the system bus 1108 via an interface, such as a video adapter 1146. In addition to the monitor 1144, a computer typically comprises other peripheral output devices (not shown), such as speakers, printers, etc.

The computer 1102 may operate in a networked environment using logical connections via wired and/or wireless communications to one or more remote computers, such as a remote computer(s) 1148. The remote computer(s) 1148 can be a workstation, a server computer, a router, a personal computer, a mobile device, portable computer, microprocessor-based entertainment appliance, a peer device or other common network node, and typically comprises many or all of the elements described relative to the computer 1102, although, for purposes of brevity, only a memory/storage device 1150 is illustrated. The logical connections depicted comprise wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which may connect to a global communications network, e.g., the Internet.

When used in a LAN networking environment, the computer 1102 is connected to the local network 1152 through a wired and/or wireless communication network interface or adapter 1156. The adapter 1156 may facilitate wired or wireless communication to the LAN 1152, which may also comprise a wireless access point disposed thereon for communicating with the wireless adapter 1156.

When used in a WAN networking environment, the computer 1102 can comprise a modem 1158, or is connected to a communications server on the WAN 1154, or has other means for establishing communications over the WAN 1154, such as by way of the Internet. The modem 1158, which can be internal or external and a wired or wireless device, is connected to the system bus 1108 via the serial port interface 1142. In a networked environment, program modules depicted relative to the computer 1102, or portions thereof, can be stored in the remote memory/storage device 1150. It will be appreciated that the network connections shown are exemplary and other means of establishing a communications link between the computers can be used.

The computer 1102 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This comprises at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

What has been described above comprises examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from by a computing device.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments comprises a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

What is claimed is:

1. A network device, comprising:
    a processor; and
    a memory that stores executable instructions that, when executed by the processor, facilitate performance of operations, comprising:
        monitoring components of a communication network that support a long term evolution standard that defines evolved packet core devices that operate to process packets as part of an all-Internet protocol network according to the long term evolution standard, wherein the components are configured according to a software-defined networking protocol that defines first rules relating to a separation of a control layer associated with the communication network from a forwarding layer associated with the communication network, and wherein the components are configured according to a network functions virtualization protocol that defines second rules relating to functions of the communication network being provided by a first virtual device that operates in a virtual environment comprising: a virtualized serving gateway device that functions as a first virtualized instance of a serving gateway device of the evolved packet core devices, a virtualized packet data network gateway device that functions as a second virtualized instance of a packet data network gateway device of the evolved packet core devices, a virtualized mobility management entity that functions as a third virtualized instance of a mobility management entity device of the evolved packet core devices, and a virtualized home subscriber server that functions as a fourth virtualized instance of a home subscriber server device of the evolved packet core devices;
        in response to the monitoring, determining an information security issue based on security protocols; and
        generating, in the virtual environment according to the first rules or the second rules, a second virtual device for the communication network that mitigates the information security issue based on the security protocols.

2. The network device of claim 1, wherein the security protocols comprise a confidentiality security protocol that promotes a determined confidentiality of first data traversing the communication network, an integrity security protocol that preserves accuracy and consistency of second data maintained by the communication network, an availability security protocol that preserves access to third data maintained by the communication network, and a forensic security protocol that preserves fourth data representing a cause of the information security issue.

3. The network device of claim 1, wherein the information security issue relates to behavior of a first component of the components that violates a first security protocol of the security protocols, identification of intrusion data that violates a second security protocol of the security protocols, or identification of network traffic associated with a second component of the components that violates a third security protocol of the security protocols.

4. The network device of claim 1, wherein the second virtual device operates to capture an image of a state of the communication network in response to the determining the information security issue, and wherein the image comprises security issue data that is determined to represent the information security issue.

5. The network device of claim 1, wherein the second virtual device operates to process security threat tracing and mitigation protocols in response to the determining the information security issue.

6. The network device of claim 1, wherein the second virtual device operates to assign additional processing resources to the first virtual device in response to the determining the information security issue.

7. The network device of claim 1, wherein the second virtual device operates to replicate the first virtual device in response to the determining the information security issue.

8. The network device of claim 1, wherein the operations further comprise:
    categorizing, based on a defined network traffic parameter of the security protocols, a first portion of network traffic directed to the first virtual device into a first group and a second portion of the network traffic into a second group; and
    routing the first portion of network traffic to the first virtual device and the second portion of network traffic to the second virtual device representing a different instance of the first virtual device that operates in the virtual environment.

9. The network device of claim 8, wherein the categorizing comprises categorizing the first portion of the network traffic into the first group based on a first determination that the first portion is suspicious according to the security protocols, and categorizing the second portion of the network traffic into the second group based on a second determination that the second portion is not suspicious according to the security protocols.

10. The network device of claim 8, wherein the categorizing comprises categorizing the first portion of the network traffic into the first group based on a first determination that the first portion originates from a first type of device, and categorizing the second portion of the network traffic into the second group based on a second determination that the second portion originates from a second type of device that is different than the first type of device.

11. The network device of claim 10, wherein the categorizing comprises categorizing the first portion of the network traffic into the first group based on a first determination that the first portion originates from a first location, and categorizing the second portion of the network traffic into the second group based on a second determination that the second portion originates from a second location that is different than the first location.

12. The network device of claim 1, wherein the operations further comprise eliminating the second virtual device in response to determining the information security issue has been mitigated.

13. A method, comprising:
controlling, by a device comprising a processor, a virtual environment comprising virtualized devices of a communication network that supports a long term evolution standard defining evolved packet core devices that operate to process packets as part of an Internet protocol network according to the long term evolution standard, wherein the virtualized devices represent virtual instances of the evolved packet core devices and are configured according to a software-defined networking protocol that defines first rules relating to a separation of a control layer of the communication network from a forwarding layer of the communication network, wherein the virtualized devices are configured according to a network functions virtualization protocol that defines second rules relating to functions of the communication network being provided in the virtual environment, and wherein the virtualized devices comprise:
a virtualized serving gateway representing a first virtual instance of a serving gateway device of the evolved packet core devices, a virtualized packet data network gateway device representing a second instance of a packet data network gateway device of the evolved packet core devices, a virtualized mobility management entity representing a third virtual instance of a mobility management entity device of the evolved packet core devices, and a virtualized home subscriber server representing a fourth instance of a home subscriber server device of the evolved packet core devices;
monitoring, by the device, network devices of the communication network and the virtualized devices;
determining, by the device, an information security threat based on security protocols; and
generating, by the device, a virtualized resource in the virtual environment that mitigates the information security threat according to the security protocols.

14. The method of claim 13, wherein the generating the virtualized resource comprises generating the virtualized resource operating to capture an image of a state of the communication network in response to the determining the information security threat, and wherein the image comprises security issue data that is determined to represent the information security issue.

15. The method of claim 13, wherein the generating the virtualized resource comprises generating the virtualized resource operating to identify a source of the information security threat in response to the determining the information security threat.

16. The method of claim 15, wherein the virtualized resource is a first virtualized resource and further comprising generating, by the device, a second virtualized resource operating to mitigate the security threat based on an identification of the source.

17. The method of claim 13, wherein the generating the virtualized resource comprises replicating a virtualized device of the virtualized devices in response to the determining the information security threat has been mitigated.

18. A non-transitory machine-readable storage medium, comprising executable instructions that, when executed by a processor, facilitate performance of operations, comprising:
controlling a virtual environment of a communication network comprising virtualized network devices that support a long term evolution standard that define evolved packet core devices that operate to process packets as part of an Internet protocol network according to the long term evolution standard, wherein the virtualized network devices are configured according to a software-defined networking protocol that defines first rules relating to a separation of a control layer associated with the communication network from a forwarding layer associated with the communication network, wherein the virtualized network devices are configured according to a network functions virtualization protocol that defines second rules relating to functions of the communication network being provided in the virtual environment, and wherein the virtualized network devices comprise: a virtualized serving gateway representing a first virtual instance of a serving gateway device of the evolved packet core devices,
a virtualized packet data network gateway device representing a second instance of
a packet data network gateway device of the evolved packet core devices, a virtualized mobility management entity device representing a third virtualized instance of
a mobility management entity device of the evolved packed core devices, and a virtualized home subscriber server representing a fourth virtualized instance of a home subscriber server device of the evolved packet core devices;
monitoring the virtualized devices and network devices associated with the communication network;
determining an information security issue based on security protocols; and
generating a virtualized resource in the virtual environment to reduce an effect of the information security issue according to the security protocols.

19. The non-transitory machine-readable storage medium of claim 18, wherein the virtualized resource operates to capture an image of a state of the communication network in response to the determining the information security issue, and wherein the image comprises security issue data that is determined to represent the information security issue.

20. The non-transitory machine-readable storage medium of claim 18, wherein the virtualized resource replicates one of the virtualized network devices in response to the determining the information security issue.

* * * * *